United States Patent [19]

Montador et al.

[11] Patent Number: 5,516,825
[45] Date of Patent: May 14, 1996

[54] BIODEGRADABLE POLYMER COMPOSITIONS

[75] Inventors: Henry J. Montador; Andrew Webb, both of Cleveland, England

[73] Assignee: Zeneca Limited, London, England

[21] Appl. No.: 381,903

[22] PCT Filed: Aug. 10, 1993

[86] PCT No.: PCT/GB93/01689

§ 371 Date: Feb. 13, 1995

§ 102(e) Date: Feb. 13, 1995

[87] PCT Pub. No.: WO94/04607

PCT Pub. Date: Mar. 3, 1994

[30] Foreign Application Priority Data

Aug. 13, 1992 [GB] United Kingdom ............... 9217131
Jun. 18, 1993 [GB] United Kingdom ............... 9312646

[51] Int. Cl.$^6$ ....................................... C08K 5/11
[52] U.S. Cl. ............................................... 524/311
[58] Field of Search ............................ 524/310, 311, 524/312; 525/450; 523/125

[56] References Cited

U.S. PATENT DOCUMENTS

| | | | |
|---|---|---|---|
| 3,182,036 | 5/1965 | Baptist et al. ............. | 524/297 |
| 4,391,938 | 7/1983 | Memon et al. . | |
| 4,705,820 | 11/1987 | Wang et al. ............. | 524/381 |
| 5,037,429 | 8/1991 | Hermes et al. ........... | 524/310 |
| 5,231,148 | 7/1993 | Kleinke et al. ........... | 525/450 |
| 5,252,642 | 10/1993 | Sinclair et al. ........... | 525/450 |

FOREIGN PATENT DOCUMENTS

| | | |
|---|---|---|
| 3635679 | 5/1988 | Germany . |
| 92153340 | 9/1992 | WIPO . |

OTHER PUBLICATIONS

Patent Abstracts of Japan, vol. 16, No. 369, (C–972) (5412) & JP, A, 41 017 432.

*Primary Examiner*—Veronica P. Hoke
*Attorney, Agent, or Firm*—Cushman Darby & Cushman

[57] ABSTRACT

Biodegradable polyesters derived from hydroxy alkenoic acids may be plasticised with an esterified hydroxycarboxylic acid which has at least three ester groups, at least some of the hydroxy groups being esterified with a carboxylic acid and at least some of the carboxy groups being esterified with an alcohol and/or phenol.

8 Claims, No Drawings

BIODEGRADABLE POLYMER COMPOSITIONS

THIS INVENTION relates to a polymer composition, in particular comprising a polyhydroxyalkanoic acid which is preferably biodegradable and a plasticiser.

Biodegradable polyesters for example the microbiologically produced polyhydroxyalkanoates can be adapted by the use of plasticiser compounds for applications where improved impact strength and decreased stiffness are important. Since such compounds should preferably also be biodegradable, many of the plasticisers used in synthetic polymer processing are not suitable for biodegradable polymers. Most commonly the glyceryl ester triacetin is used, but it is more volatile than could be desired during melt processing or storage at high ambient temperatures.

The invention provides a composition comprising a polyhydroxyalkanoate and a plasticising quantity of at least one doubly esterified hydroxycarboxylic acid having at least 3 ester groups in its molecule.

"Doubly esterified" means that at least some of the hydroxy groups of the hydroxycarboxylic acid are esterified with a carboxylic acid and at least some of the carboxy groups thereof are esterified with a phenol or preferably an alcohol. Preferably at least 90% molar, more preferably substantially 100% molar of both such groups are so esterified.

In principle it is relatively difficult to plasticise stereospecific polyesters of high crystallinity. Surprisingly we have found that the plasticiser of this invention are remarkably effective in plasticising such polymers. The polyhydroxyalkanoate component is especially capable of a relatively high level of crystallinity, for example over 30% especially 50–90%, in the absence of plasticiser. Suitably it is or includes at least one polyester which is suitably microbiologically produced-having units of formula I:

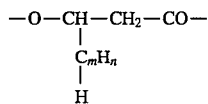

where m is in the range 1–11 and n is 2m or (when m is at least 2)2m-2. In very suitable polyesters m is 1 or 2, n is 2m and especially there are units with m=1 and m=2 copolymerised together. Particular polyesters contain a preponderance of m=1 units, especially with 70 to 98 mol % of such units, the balance being units in which m=2. The molecular weight of the polymer is preferably over 100000, especially over 300000. They suitably have the D (-) configuration.

The polyhydroxyalkanoate is Conveniently a blend of two or more polymers differing in the value of m. A particular example contains (a) polymer consisting essentially of Formula I units in which 2–5 mol % of units have m=2, the rest m=1; and
(b) polymer consisting essentially of Formula I units in which 5–30 mol % of units have m=2, the rest m=1.

The proportions of the polymers in such a blend are preferably such as give an average m=2 content in the range 4–18 mol %.

The polyhydroxyalkanoate is preferably a fermentation product, especially of a microbiological process in which a microorganism lays down polyhydroxyalkanoate during normal growth or is caused to do so by cultivation in the absence of one or more nutrients necessary for cell multiplication. The microorganism may be wild or mutated or may have the necessary genetic material introduced into it.

Examples of suitable microbiological processes are the following:

for Formula I material with m=1 or m=partly 1, partly 2: EP-A-69497 (*Alcaligenes eutrophus*)

for Formula I materials with m=1

U.S. Pat. No. 4,101,533 (*Hydrogenomonas eutrophus* H-16)

EP-A-144017 (*Alcaligenes latus*)

for Formula I material with m=3–7

EP-A-0392687 (various Pseudomonas).

The polymer can be extracted from the formulation product cells by means of an organic solvent, or the cellular protein material may be decomposed leaving granules of polymer. For specialised end uses the cellular protein may be partly or wholly allowed to remain with the polymer, but preferably subjected to cell breakage.

Alternately the PHA can be a product of synthetic chemistry using processes known in the art. PHB can be prepared according to Bloembergen, S. and Holden, D. A., Macromolecules. 1989, Vol 22, p1656–1663. PHBV can be prepared according to Bloembergen, Holden, Bluhm, Hamer and Marchessault, Macromolecules. 1989, Vol 22, p1663–1669.

The hydroxycarboxylic acid from which the ester is derived is preferably aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups.

The groups with which the carboxy groups are esterified contain preferably 1–7, especially 2–5 carbon atoms. In the ester molecule they can be the same or different. Preferably they are aliphatic. For thermal stability and biodegradability such aliphatic groups preferably have straight chains. If desired, a small portion of these groups are divalent, so as to give an oligomer suitably containing up to 3 hydroxyacid residues.

The groups with which the hyroxy groups are esterified preferably contain 2–7, especially up to 4, carbon atoms, including the carboxy carbon atom. In the ester molecule such groups can be the same or different. Preferably they are aliphatic and, for thermal stability and biodegradability, have straight chains. If desired, a small proportion of these groups are divalent, so as to give an oligomer suitably containing up to 3 hydroxyacid residues.

The ratio of plasticiser to polymer depends on the intended use of the composition. The range 2–40 phr w/w includes most of the likely uses. For making effectively rigid but not brittle articles the range 5–20 especially 6–12, phr w/w is generally suitable; "phr" means parts of plasticise per hundred parts of polymer.

The composition can contain the usual polymer processing additives such as fillers, fibres, nucleants and pigments. It can be in the form of mouldings, extrudates, coatings, films or fibres, including multilayer coatings, films or fibres.

The invention provides methods of making the composition by mixing its components. If desired, this may be effected in a solvent, such as a halogenated hydrocarbon or alkylene carbonate. Such a method is convenient for coating or for centrifugal spinning of fibres. More conveniently the plasticiser is mixed with powdered dry polymer and the mixture is treated in conditions of shear, such as in a plastic mill or extruder. The product is then granulated, used as feed for a shaping operation for example a melt forming operation for example extrusion, injection moulding, injection blow-moulding, compression moulding or thermoforming.

The composition is especially useful for making the following articles:

films, especially for packaging fibres non woven fabrics extruded nets personal hygiene products bottles and drinking vessels agricultural and horticultural films and vessels ostomy bags

EXAMPLE 1

Preparative Procedure (a) A masterbatch of the following composition by weight was made by dry-mixing finely powdered ingredients:

| | |
|---|---|
| PHA of average molar composition 92% butyrate, 8% valerate* | 100 |
| boron nitride nucleant | 1 |
| titanium dioxide pigment | 1 |

*70:30 w/w blend of respectively 4 mol % and 20 mol % valerate polymer;

(b) Plasticiser (10 phr w/w) was added to a sample of the dry powdered masterbatch and mixed in for 20 min in a Hobart mixer.

(c) The mixed sample was extruded using a Betol 2520 extruder in the following conditions:

| Barrel zone | |
|---|---|
| 1 | 140° C. (inlet) |
| 2 | 150° C. |
| 3 | 165° C. |
| Die | 165° C. |

The extrudate was crystallised in a water bath at 60° C. and granulated.

(d) The granules were injection moulded using a Boy 15S machine in the following conditions:

| Barrel zone | |
|---|---|
| 1 | 140° C. (inlet) |
| 2 | 145° C. |
| Nozzle | 150° C. |
| Mould temp. | 60° C. |
| Injection time | 15 sec |
| Cooling time | 20 sec |
| Cycle time | 38 sec |
| Injection pressure | 45 bar |
| Screw speed | 260 rpm |

(e) Mouldings were stored at ambient temperature.

Test procedures

Me;t Flow Index (MFI)

A sample of granules was tested at 170° C. under a loading of 2.16 kg. The weight of polymer which flowed through a 2.09 mm orifice per minute at 5 min and 10 min was recorded. The time at which the flow rate doubled from its rate at 5 minutes was recorded as an inverse measure of the stability of the formulation.

Differential Scanning Calorimetry (DSC)

A 6 to 8 mg sample of granules was sealed in the pan of a Perkin-Elmer DSC 4 differential scanning calorimeter. It was then heated at 20° C. per min from 20°to 200° C., held isothermally for 2 min and cooled back to 20° C. at 20° C. per min. The melting point, $T_m$, and crystallisation temperatures on cooling, Tc, were determined from the scan trace.

Dynamic Mechanical Thermal Analysis (DMTA)

For each measurement a Polymer Laboratories DMTA instrument in single cantilever bending mode was used. A tensile bar was cut from a moulding from step (d) above, possibly after ageing. Samples were run from minus 100 to 100° C. at 2° per min. The strain was set at ×4 and frequencies at 3, 10 and 30 Hz.

Flexural Modulus

Three replicates from each sample were tested using an Instron 1122 instrument with a span of 100 mm used on the 3-point bending jig with a crosshead speed of 5 mm/min. This test was repeated after six months at ambient temperature.

Impact Strength

Five replicates from each sample were tested using a Zwick Pendulum Tester. An impact bar was notched on the same side but at opposite ends-to the sprue with the 1 mm radius cutter. The appropriate hammer was selected and the sample tested. This test was repeated after storing the samples for three and six months at ambient temperature.

Tensile Properties

This was performed using the Instron 1122 fitted with a Nene data analysis system. A jaw separation of 50 mm and a crosshead speed of 10 mm/min were used. The tensile bar was inserted into the grips so that the injection point was always in the lower jaws. A gauge length of 40mm was used for the calculations and again 5 replicates were tested at 0, 3 and 6 months at ambient temperature.

Weight Loss

Five impact bars from each sample were stored at 40° C. for six months and weighed at monthly intervals.

The results shown in the Table compare the properties of samples according to the invention using acetyl tributyl citrate ATBC as plasticiser with those of samples in which the plasticiser was triacetin.

TABLE 1

| | Plasticiser | |
|---|---|---|
| Property | ATBC | Triacetin |
| MFI, | | |
| 5 min | 0.96 | 0.94 |
| 10 min | 1.60 | 1.70 |
| doubling time, min | 6.8 | 6.0 |
| DSC | | |
| Tm °C. | 155.9 | 151.8 |
| Tc °C. | 94.5 | 91.1 |
| DMTA | | |
| β Relaxation °C. | 5.0 | −1.0 |
| tan δ | 0.098 | 0.111 |
| Flex Mod, MPa | | |
| 1 month | 778 | 730 |
| 6 months | 1228 | 1159 |
| Impact strength J/m | | |
| 1 month | 261 | 198 |
| 6 months | 177 | 140 |
| Young's modulus MPa | | |
| 1 month | 542 | 505 |
| 6 months | 663 | 581 |
| Stress at Peak MPa | | |
| 1 month | 22.3 | 21.4 |
| 6 months | 26.0 | 25.2 |

TABLE 1-continued

| | Plasticiser | |
|---|---|---|
| Property | ATBC | Triacetin |
| Elongation at break % | | |
| 1 month | 19 | 13 |
| 6 months | 17 | 13 |
| Weight lose % | | |
| 1 month | 0.24 | 0.80 |
| 3 months | 0.28 | 1.66 |
| 6 months | 0.31 | 2.63 |

In comparison with the triacetin formulation, the following properties of the acetyl tributyl citrate (ABTC) plasticised material are evident:

Melt flow, melting point and stability to thermal degradation are similar.

relaxation and tan β: these properties are little changed;

Flexural Modulus : the new formulation is slightly stiffer and undergoes about the same proportional increase on storage;

Impact strength : the new formulation is initially one-third stronger and maintains much of this advantage on storage;

Young's modulus : the new formulation is significantly stiffer initially and after storage;

Stress at peak : the new formulation is substantially equal;

Elongation at break : the new formulation is more elastic;

Weight loss : the new formulation retains plasticiser much more completely. Consistent with this, the new formulation had a much less noticeable odour.

We claim:

1. A plasticised polymer composition which comprises
   (a) at least one biodegradable microbiologically produced polyhydroxyalkanoate which consists of units of Formula I

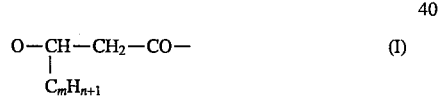

in which n is 2 m and m=1 to the extent of 70 to 98 mol percent and m=2 for the balance; is stereospecific with a D(−) configuration; has a molecular weight in excess of 100,000; and is capable of a level of crystallinity of 50 to 90% in the absence of plasticiser; and
   (b) 5 to 20 phr by weight of at least one esterified aliphatic hydroxy carboxylic acid having a backbone which contains 2 to 6 carbon atoms, and having 2 to 4 carboxy groups substantially all esterified with aliphatic alcohol containing 1 to 7 carbon atoms and 1 to 3 hydroxy groups substantially all esterified with aliphatic acid containing 2 to 7 carbon atoms including the carboxy carbon atom.

2. A composition according to claim 1 in which the polyhydroxyalkanoate is a blend of
   (a) a polymer consisting essentially of Formula I units in which 2–5 mol % of units have M=2, the rest of m=1; and
   (b) polymer consisting essentially of Formula I units in which 5–30 mol % or units have m=2, the rest m=1, in proportions such as to give an average m=2 content in the range of 4–18 mol %.

3. A process of making a composition as claimed in claim 1 which comprises mixing its components.

4. A process as claimed in claim 3 in which the plasticiser is mixed with dry polymer powder and the mixture is subjected to shear.

5. A process in which a composition as claimed in claim 1 is formed into a shaped article by subjecting it to a heat forming operation.

6. A granular composition adapted as feed for a melt forming operation comprising
   (a) at least one biodegradable microbiologically produced hydroxyalkanoate copolymer which consists of Formula I

in which n is 2 m and M=1 to the extent of 70 and 98 mol percent and m=2 for the balance; is stereospecific with a D(−) configuration; has a molecular weight in excess of 100,000; and is capable of a level of crystallinity of 50 to 90% in the absence of a platiciser; and
   (b) 5 to 20 phr by weight of at least one esterified aliphatic hydroxy carboxylic acid having a backbone which contains 2 to 6 carbon atoms, and having 2 to 4 carboxy groups substantially all esterified with aliphatic alcohol containing 1 to 7 carbon atoms and 1 to 3 hydroxy groups substantially all esterified with aliphatic acid containing 2 to 7 carbon atoms including the carboxy carbon atom.

7. A composition according to claim 1 in which the esterified aliphatic hydroxycarboxylic acid is acetyl-tri-n-butyl citrate.

8. A composition according to claim 6 in which the esterified aliphatic hydroxycarboxylic acid is acetyl-tri-n-butyl citrate.

* * * * *